(12) United States Patent
Algaonkar et al.

(10) Patent No.: US 8,775,151 B2
(45) Date of Patent: Jul. 8, 2014

(54) SYSTEM AND METHOD FOR DETERMINING CHARACTERISTICS OF POWER CABLES USING DISTRIBUTED TEMPERATURE SENSING SYSTEMS

(76) Inventors: Mahesh U. Algaonkar, Buda, TX (US); Kent Kalar, Austin, TX (US); Kari-Mikko Jaaskelainen, Katy, TX (US)

( * ) Notice: Subject to any disclaimer, the term of this patent is extended or adjusted under 35 U.S.C. 154(b) by 574 days.

(21) Appl. No.: 12/998,531

(22) PCT Filed: Nov. 4, 2009

(86) PCT No.: PCT/US2009/005969
§ 371 (c)(1),
(2), (4) Date: Apr. 30, 2011

(87) PCT Pub. No.: WO2010/053542
PCT Pub. Date: May 14, 2010

(65) Prior Publication Data
US 2011/0218790 A1    Sep. 8, 2011

Related U.S. Application Data

(60) Provisional application No. 61/198,610, filed on Nov. 8, 2008, provisional application No. 61/209,650, filed on Mar. 9, 2009.

(51) Int. Cl.
G06G 7/54        (2006.01)
G02B 6/00        (2006.01)
G01K 11/32       (2006.01)

(52) U.S. Cl.
CPC .................................. G01K 11/32 (2013.01)
USPC ............................................ 703/18; 385/13

(58) Field of Classification Search
USPC .............................................. 703/18; 385/13
See application file for complete search history.

(56) References Cited

U.S. PATENT DOCUMENTS

| | | |
|---|---|---|
| 4,298,794 A | 11/1981 | Snitzer et al. |
| 4,675,773 A | 6/1987 | Shirakawa et al. |
| 5,006,846 A | 4/1991 | Granville et al. |
| 5,181,026 A | 1/1993 | Granville |
| 5,793,481 A | 8/1998 | Leali |
| 5,933,355 A | 8/1999 | Deb |
| 6,559,437 B1 | 5/2003 | Pope, Jr. et al. |
| 6,811,307 B2 | 11/2004 | Crowe et al. |
| 7,117,742 B2 | 10/2006 | Kim |
| 7,135,988 B2 | 11/2006 | Kawai et al. |
| 7,197,931 B2 | 4/2007 | Kim |
| 7,246,521 B2 | 7/2007 | Kim |
| 2004/0091015 A1* | 5/2004 | Crowe et al. .................. 374/130 |
| 2004/0105635 A1* | 6/2004 | Nandi et al. .................. 385/101 |
| 2005/0061076 A1 | 3/2005 | Kim |
| 2006/0179949 A1 | 8/2006 | Kim |
| 2006/0260402 A1 | 11/2006 | Kim |
| 2006/0268263 A1 | 11/2006 | Kim |
| 2006/0285850 A1* | 12/2006 | Colpitts et al. ................ 398/108 |
| 2007/0006653 A1 | 1/2007 | Kim |
| 2007/0038396 A1* | 2/2007 | Zima et al. ...................... 702/65 |

\* cited by examiner

*Primary Examiner* — Dwin M Craig
(74) *Attorney, Agent, or Firm* — Michael A. Ervin; Krueger Iselin LLP (57) ABSTRACT

A system and method using both static and transient modeling of power cables coupled with real time measurements of distributed temperature profiles of both the cable and it's immediate environment to optimize the current loads of the power cable. The optical fibers used for measuring distributed temperature profiles can be integrated directly into the monitored power cables or be deployed alongside the power cables, including using the optical fibers deployed in optical power ground wire systems.

5 Claims, 6 Drawing Sheets

FIG 7B ns are made to
SYSTEM AND METHOD FOR DETERMINING CHARACTERISTICS OF POWER CABLES USING DISTRIBUTED TEMPERATURE SENSING SYSTEMS This application claims the priority of U.S. provisionals 61/198,610 (Nov. 8, 2008) and 61/209,650 (Mar. 9, 2009).

BACKGROUND OF THE INVENTION

1. Field of the Invention

The system and method described here relates generally to transmission power cable monitoring and particularly to the real time optimization of current loads of power cabling systems.

2. Description of Related Art

Several things impact the capacity of a power cable. The capacity is limited by the heating of the line due to factors such as the inherent electrical resistance of the conductor and the current load. If the power cable is overextended (e.g., increase demands on the power cable), the power cable can overheat causing unsafe conditions and potential mechanical breakdown (e.g., sag) that lead to costly repairs. In order to prevent these breakdowns, ampacity calculations are made to determine a maximum temperature that the power cable may endure. Ampacity is the current carrying capacity of a cable.

For a power cable, the size and electrical properties of the electrical conductors, the cable design, and the capacity of the installation to extract cable heat and dissipate it into the surrounding environment determine the ampacity. Cable insulation materials age faster at higher temperatures and the insulating properties often decrease with increasing temperatures. The maximum operating temperature of a cable is limited by the cable design, insulation material, the ambient temperature and thermal conductivity of the medium where the cable is deployed, and desired service life. The cable insulation experiences different temperatures depending on duration and intensity of the current circulating in the conductors and environmental factors. The consequence of excessive operating temperatures is life-reducing damage to the cable and/or permanent insulation break down causing total loss of the cable.

Cable operating temperatures depend on the load "shape" applied (i.e. the intensity of the current and its time variations). Subsequently, cables have different ratings such as steady state, cyclic, transient (emergency) and short-circuit. Transient analyses are typically used to calculate cable thermal ratings under emergency situations. Cable installations also have thermal inertia (it takes time to heat up the cable and its surroundings).

If these "load shapes" and the thermal environment are not taken into account it is difficult to make useful predictions regarding future performance of cable systems. Distributed temperature sensing (DTS) systems provide real-time temperature measurements using optical fibers deployed in or along power cables but do not provide temperature rise/fall predictions based on load shapes.

Therefore determining the maximum current and applied period that the power cable can sustain without thermally induced insulation deterioration allows for more effective and life-prolonging utilization. Ampacity calculations can provide for off-line planning circuit optimization tools. Combined with DTS systems, they can be used in a continuous way to compute the expected operating temperature of cables in an installation and can compute the temperature of the conductor given the fiber temperature. With this information then the complete system can provide off-line planning tools for circuit optimization Current technologies to monitor the current load and/or perform ampacity calculations often employ mounting a monitoring system to the power cables. These monitoring systems include resistance temperature monitors, current transformers, and more generally, thermocouples and/or solid-state or electromechanical transducers. However, these monitoring systems are often unreliable and unsafe, especially in an extremely high voltage environment. Electrical sensing systems are sensitive to Electro Magnetic Interference (EMI) caused by the electrical and magnetic fields in or around power cables. This EMI disturbance may interrupt, obstruct, or otherwise degrade or limit the effective performance of the electrical sensing systems. Further, if the monitoring system is subjected to electrical fields of a certain magnitude, damage and/or failure of the monitoring system is likely.

These current technologies are severely limited in that they do not provide a spatially continuous or distributed temperature measurement. This is critical because a power cable may have a localized "hot spot" from a heat source in close proximity to the power cable that would be undetected by these approaches.

Examples of heat sources for buried power cables are other power cables crossing the path and generating heat, steam pipes that cross near the cable or in a worst case may even run next to the power cable for some distance, localized manufacturing defects in the power cable (high localized resistance R). Other issues could be varying thermal resistivity in the ground along the length of the power cable or cable duct. Other hot spots could be cable splices where you need to connect two lengths of cable, and these joints are often a concern.

For overhead power cables, the heat source may be sun loading and daily and/or seasonal temperature variations. The cooling effect of wind may impact the temperature and there may be localized pockets where this cooling effect may be very limited and thereby causing hot spots.

Software for ampacity monitoring currently exists but is expensive. In addition software only solutions cannot possibly predict issues such as hot spots. To deal with hot spots, operators often calculate the ampacity for a given cable using expected site conditions such as thermal resistance between cable and environment, expected temperatures and the maximum designed current carrying capacity of the cable. They then de-rate this calculated ampacity value to account for un-expected hot spots and potential inaccuracies in the model. The operators often limit the cable to only carry e.g. 70% of the calculated load.

Knowing the exact location of hot spots by simultaneous use of a distributed temperature measuring system combined with a distributed ampacity model would target these issues and allow the operators to base the circuit (cable) ampacity based on actual hot spot data. This approach would allow the end-user use the cable up to the maximum of the design rating as long as the hot spots are correctly identified and accounted for. Any seasonal variability in temperature and thermal resistance would be accounted for and the system ampacity can be calculated in real time. The combination of forward predictions of ampacity with the real time feedback of actual temperature can enable the system to "self-learn" with real data over time. This could also provide planning optimization tools.

What is needed then is an ampacity monitoring system that uses real time data to take load shapes into account and provides ampacity ratings for static (steady state) and transient (emergency) conditions. For static systems the need is for a system that takes into account cable design, and both cable insulation and cable duct thermal properties to estimate heat generated by resistive losses inside the conductor and how heat is dissipated through the various cable layers. In addition any static model needs to account for the thermal conductivity between the cable and cable duct as well as how various duct materials thermal conductivity impacts the model.

For transient considerations any monitoring system needs to use supplied data to calculate predicted temperatures and to update the thermal conductivity values in the model. The transient model also needs to account for the thermal lag inherent in any cable installation.

Finally there is a need to predict the reliable lifetime of the cable based on the cumulative time at various temperatures. Utilities replace cables today based on how long time the cables have been in operation regardless of the loading the cables experienced during the service life. By continuously measuring the cable temperature, cumulative aging of cable insulation can be calculated. This will allow the utilities to replace the cables most likely to fail based on actual insulation aging data rather than replacing them on service life alone. This may represent significant improvements in circuit and system reliability with significant cost savings as only cables at risk will be replaced and the service life of the remaining cables will be extended.

An electrical power transmission network typically comprises an electrical power generation source that is connected to an electrical power distribution network by overhead electrically conductive cables suspended between spaced-apart towers that are installed along electric utility right-of-ways. These electrically conductive cables are susceptible to lightning strikes because of the conductive characteristic of the cabling and the height of the support towers. Cables called "ground wires" are typically suspended between the spaced-apart support towers and above the base electrical conductors of the power transmission network to protect from the high current surges presented by direct or nearby lightning strikes. These ground wires, also called shield wires or earth wires, provide a path for the high current transients generated by lightning strikes within the proximity of the ground wire to safely discharge via the ground wire, the local support towers, and the ground.

The electric utility right-of-ways for overhead electrical power transmission lines often provide an attractive path for the installation of overhead telecommunication cables. Because the communications content of light signals carried by optical fibers are not affected by the high voltage and current environment typically found within an electrical power transmission network, ground wire cables are often combined with an optical fiber or, more often, a bundle of optical fibers, to efficiently provide light wave communications via the existing overhead transmission network, More specifically, a bundle of optical fibers are typically mounted within an electrical conductor to form a ground wire cable that is installed between spaced-apart support towers and above the electrical transmission lines. In this manner, the ground wire cable functions as both a ground wire and a telecommunications cable and thereby enables the existing electric utility right-of-way to be used for telecommunications. These combined systems are sometimes referred to as optical fiber composite overhead ground wires and the acronym OPGW is often used. The contained optical fibers are actually insulators and help protect against power transmission line and lightning induction, external noise, and crosstalk. Typically OPGW cables contain single-mode optical fibers because of the low transmission loss, allowing long distance transmission. These fibers are routed to instrument rooms at suitable distances where they may be connected to optical amplifiers/repeaters for optical communication.

A power utility company often installs many more fibers than it needs for internal communications both to allow for future needs and also to lease or sell to communications companies. Rental fees for these spare fibers can provide a valuable resource of revenue for the electrical utility. These spare fibers represent one potential embodiment of the disclosed new system and method described in this application. The use of the already deployed optical fibers within OPGW cables could allow a practical and affordable system that does not require the investment and deployment in optical fibers embedded in power cables. In addition use of OPGW cables addresses many questions related to installation safety and long-term reliability of an optical fiber monitoring system.

The previously mentioned needs for an ampacity monitoring system for power cables that uses real time data to take load shapes into account and provides ampacity ratings for static (steady state) and transient (emergency) conditions could thus be implemented without the major investment of resources in the deployment of new optical fiber by a system to be described herein in conjunction with the use of spare optical fibers contained in OPGW cables.

SUMMARY OF THE INVENTION

This need is addressed by a system for determining characteristics of power cables using distributed temperature sensing systems including at least: a processor; a DTS system coupled to the processor, the DTS system configured to: receive as input a load measurement of a power cable; receive signals relating to the temperature of the power cable; and forward the received load measurement and signals relating to the temperature to the processor; wherein the processor is configured to determine the characteristics of the power cable based at least on the received load measurement and signals relating to the temperature of the power cable.

A further aspect of the system described here is wherein the DTS is further configured to: enable a light source to emit a wavelength through a sensor fiber coupled to the power cable; and wherein the DTS is configured to receive signals relating to the temperature of the power cable comprises the DTS configured to receive a Stokes and an anti-Stokes signal resulting form the emitted wavelength of the light source and to use that information to calculate a distributed temperature along the power cable. This capability can include not only the distributed temperature along the conductor, but along the various layers and in the environment surrounding the power cable. This capability includes the capability to identify hot spots by location.

Another aspect of the system and method described herein is the possible use of the optical fibers contained in optical power ground wires (OPGW) already deployed along power cable systems.

The need is also addressed by a method for determining characteristics of power cables using distributed temperature sensing systems, including at least the steps of: receiving as input a load measurement of a power cable; receiving as input signals relating to one or more temperatures of the power cable; and based at least on the load measurement and the signals relating to one or more temperatures of the power cable, determining an ampacity of the power cable.

A further aspect of the system described here is a system and method for predicting both static and transient ampacity of a power cable system using a combination of real time load measurements, temperature measurements and predictive equations.

A further aspect of the system described here is a system and method for prediction useful lifetime of a power cable system using a combination of real time load measurements, temperature measurements and predictive equations.

Other features and associated advantages will become apparent with reference to the following detailed description of specific embodiments in connection with the accompanying drawings.

BRIEF DESCRIPTION OF THE SEVERAL VIEWS OF THE DRAWING

The following drawings form part of the present specification and are included to further demonstrate certain aspects of the system described here. The system described here may be better understood by reference to one or more of these drawings in combination with the detailed description of specific embodiments presented herein.

DETAILED DESCRIPTION OF THE INVENTION

Preferred embodiments and their advantages are best understood by reference to FIGS. 1 through 7.

The present disclosure provides systems and methods for determining parameters of a power cable using an optical fiber-based distributed temperature sensor (DTS) system. The integrated inventive system is configured to estimate the ampacity of power lines using mathematical modeling of the heat transfer in the cable system coupled with both historical and freshly updated temperature and load data from the power cable. By using the mathematical modeling coupled with a DTS system, information may be processed faster and may occur at substantially real-time.

Figure 1:
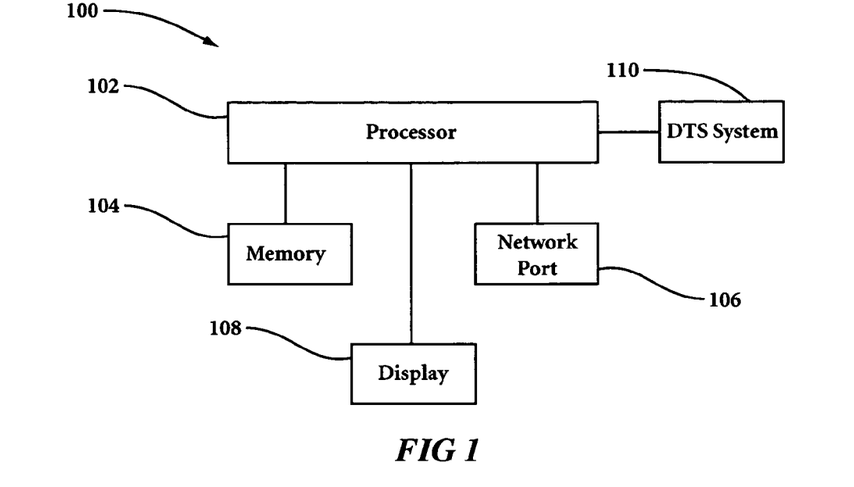
FIG. 1 illustrates an example system for dynamic ampacity determination using DTS, in accordance with embodiments of the present disclosure.

Referring to FIG. 1, an integrated system 100 for determining the ampacity of a power cable is shown, in accordance with embodiments of the present disclosure. System 100 may include a processor 102, memory 104, network port 106, display 108, and a DTS system 100.

Processor 102 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 104 and/or another component of information handling system 100 and may output results, graphical user interfaces (GUIs), websites, and the like via display 108 and/or over network port 106.

Memory 104 may be coupled to processor 102 and may comprise any system, device, or apparatus operable to retain program instructions or data for a period of time. Memory 104 may be random access memory (RAM), electrically erasable programmable read-only memory (EEPROM), a PCM-CIA card, flash memory, or any suitable selection and/or array of volatile or non-volatile memory that retains data after power to information handling system 100 is turned off. In one embodiment, memory 104 may store data related to the functionality of a power cable (e.g., load information, temperature profiles, data related to the signals received from an optical fiber coupled to DTS 110, etc.).

Network port 106 may be any suitable system, apparatus, or device operable to serve as an interface between information handling system 100 and a network. Network port 106 may enable information handling system 100 to communicate over a network using any suitable transmission protocol and/or standard, including without limitation all transmission protocols and/or standards known in the art. In some embodiments, network port may be configured to receive load information from a load-measuring device, details of which are provided below.

Figure 4A:
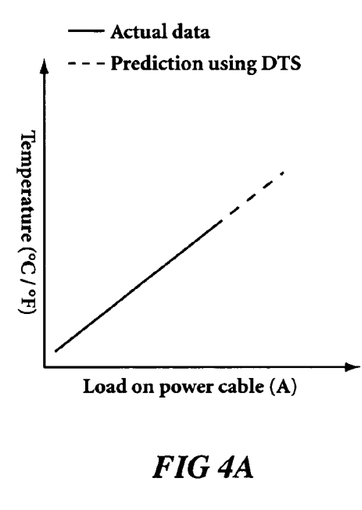
FIGS. 4A and 4B illustrate example of load carried on power cable as a function of temperature and time, respectively, in accordance with embodiments of the present disclosure.
Figure 4B:
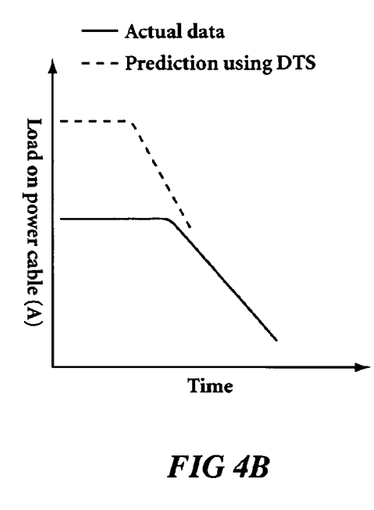

Display 108 may comprise any display device suitable for creating graphic images and/or alphanumeric characters recognizable to a user, and may include, for example, a liquid crystal display (LCD) or a cathode ray tube (CRT). In one embodiment, display 108 may provide user information related to the power cable. For example, display 108 may display graphical representation (e.g., FIGS. 4A and/or 4B) showing the load of the power cable as a function of time, temperature, etc.

DTS system coupled to processor 102 may be configured to receive optical signals transmitted by an optical fiber, load conditions of power cable, and other suitable information related to the state of a power cable (e.g., voltages, currents, etc.). In operation, DTS system 110, may include a single light, dual light, or multiple light sources emitting one or several wavelengths through an optical fiber. Resulting OTDR information (e.g., Rayleigh and/or spontaneous and/or stimulated Raman back scattered light occurring in the optical fiber as a result of the emitted wavelength) may be collected by DTS system 110 and may be used to determine a distributed temperature profile of the power cable.

It is noted that processor 102 may be integrated into DTS system 110. In the same or alternative embodiment, processor 102 may be communicatively connected to DTS system 110 over a network (e.g., a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data), or any combination thereof). In some embodiments, DTS system 110 may transmit data over a network using wireless transmissions and/or wire-line transmissions via any storage and/or communication protocol, including without limitation, Fibre Channel, Frame Relay, Asynchronous Transfer Mode (ATM), Internet protocol (IP), Transmission Control Protocol (TCP), Internet Printing Protocol (IPP), other packet-based protocol, and/or any combination thereof. The network may include various components that may be implemented using hardware, software, or any combination thereof. In some embodiments, the network may include one or more network access points (e.g., wireless access points) that are configured to receive and/or transmit network data in order to route and/or relay such data among the various components of DTS system 110 and processor 102.

In order to determine the one or more parameters relating to the power cable, one or more sensing fibers may be provided. In one embodiment, one or more optical fibers may be placed next to, in proximity of, or in direct contact to the exterior wall of a power cable. The one or more optical fibers may emit and/or generate signals relating to the temperature of the power cable, and in some embodiments, the temperature of the environment (e.g., ambient air, underground temperature, structure temperature, etc.) which may be subsequently received by DTS system 100 and processed by processor 102 and/or DTS system 110.

Figure 2:
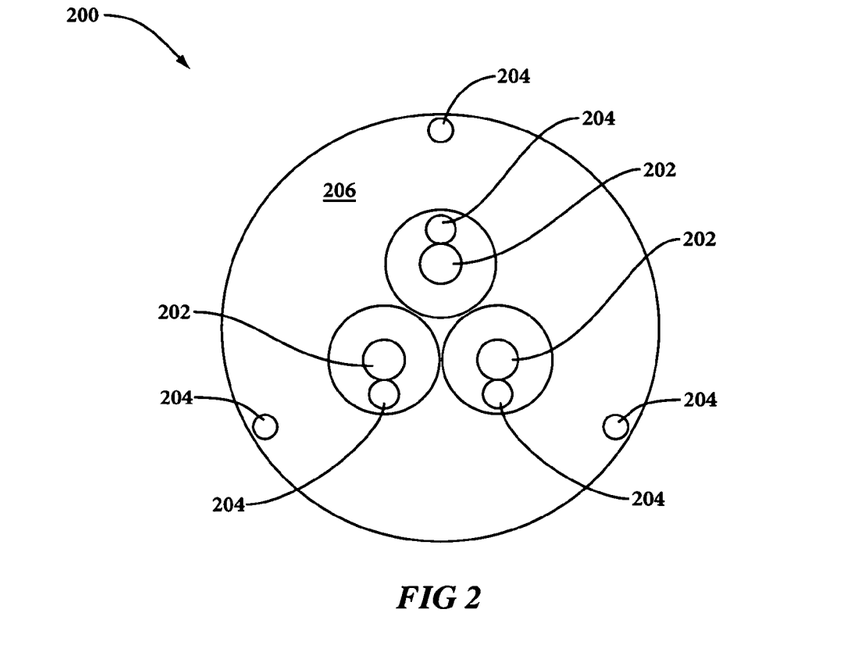
FIG. 2 illustrates a power cable design with one or more sensor fibers, in accordance with embodiments of the present disclosure.

In the same or alternative embodiments, one or more optical fibers may be deployed within a power cable. Referring to FIG. 2, a cross-section of one power cable design 200 is shown, in accordance with embodiments of the present disclosure. Power cable 200 may be installed overhead in ambient air, buried underground, or may be installed in structures (e.g., buildings, homes, etc.). Power cable 200, which may be in coupled to DTS system 110 of FIG. 1, may include one or more conductors 202 and one or more sensing fibers 204. It should be recognized that there are many possible power cable designs possible, with different combinations of conductors, sheaths, other insulation layers, armored layers, bedding layers, outer layers etc. and the system described here anticipates modeling each design choice.

Conductors 202 may include be made of any material (e.g., aluminum, copper, or other suitable metals) that includes moveable electrical charges may be configured to transmit electrical power.

Sensing fiber 204 may be an optical fiber configured to light signals from DTS system 110, and more particularly, any electromagnetic light source (e.g., a laser). Resulting reflective light signals may be transmitted through sensing fiber 204 to DTS system 110.

In some embodiments, one or more sensing fiber 204 may be placed next to, in proximity of, or in direct contact with conductors 202. In this configuration, sensing fiber 204 may be used to sense signals relating to the temperature of conductors 202.

In the same or alternative embodiments, one or more sensing fibers 204 may be located within sheath 206, and more in some configurations, fibers 204 may be placed next to the perimeter of sheath 206, and may be used to sense signals relating to the temperature surrounding power cable 200.

It is noted that any combination including the placement of sensing fiber(s) 204 placed next to, in proximity of, or in direct contact to the outer wall power cable 204, the placement of sensing fiber(s) 204 next to, in proximity of, or in direct contact to conductors 202, and/or the placement of sensing fiber(s) 204 within sheath 206 (e.g., next to, in proximity of, or in direct contact with in an interior wall of power cable 204) may be used.

In particular, one combination of note is the possibility of using fiber optic cables that may already be in place in a power cable application. Many power cables are used in conjunction with Optical Power Ground Wires (OPGW). Optical ground wires provide grounding and often include optical fibers for communication. There is normally no electrical voltage on OPGW's. These fibers are routed to instrument rooms at suitable distances where they may be connected to optical amplifiers/repeaters for optical communication.

Some clear advantages of use of existing OPGW installations are in the areas of safety and cost. Installation of fiber optic sensing cables into an existing power cable system is time consuming and cannot be done while power is on due to the risk of electrical shock. Integrating the sensing fiber into the power cable must be done when the cable is ordered and the majority of the US power grid is already in place. Even if the fiber is attached rather than built in it will be difficult to get the fiber from the power cable and to a DTS instrument in a safe and reliable way. The sensing cable must be non-conductive or it will cause a short circuit path. Any short circuit paths are very dangerous to people and equipment. The high voltages would create a very high current in the cable and melt it instantaneously. Optical power ground wires are by contrast already deployed and often already have available single mode fiber optic cable perfectly suitable for DTS application. These fibers are already routed to instrument rooms at suitable distances where some are connected to optical amplifiers/repeaters for optical communications. The disclosure of this application anticipates the use of either existing OPGW lines or of installed fiber optics, either integrated into power cables or installed in proximity to or attached to power cables.

Figure 7A:
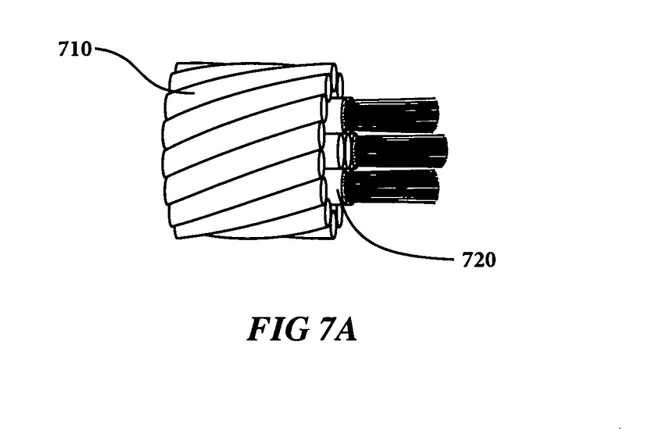
FIGS. 7a and 7b illustrate examples of optical power ground wires with optical fibers.
Figure 7B:
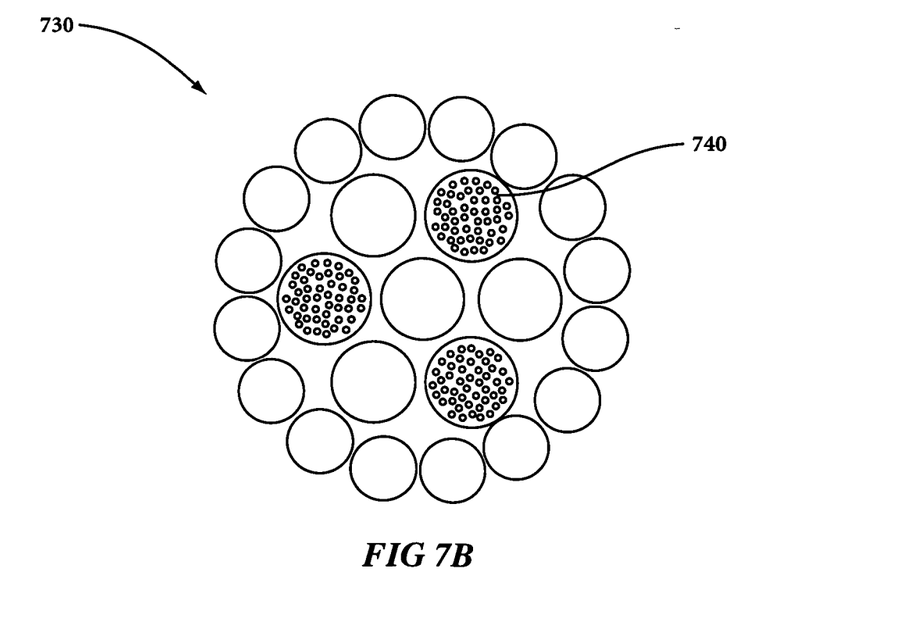

The OPGW see the same environmental load as the power cables. As the OPGW includes optical fibers, it will be fairly straightforward to measure the temperature along the power cable. It is only necessary to come to instrument rooms and connect the fiber to a DTS system. There is no need to install fiber, as it is often already available in the OPGW. FIG. 7A shows a side view of one commercial example of a OPGW cable 710 in which the optical fibers are in a center tube 720. FIG. 7B shows an end view of another commercial design OPGW with inner fiber tubes 740 embedded in the overall structure 730, each with multiple optical fibers. Some OPGWs have the fiber tubes in the outer layer for easy access. In most OPGW cables the enclosed optical fibers are single mode fibers suitable for long distance communication. The number of optical fibers varies by application.

The basis for an integrated ampacity prediction model relies on International Standard IEC 287. IEC 287 covers medium-voltage and high voltage cables, many different constructions, and many installation types. The primary focus of IEC 287 is on static computations. When a conductor is energized, heat is generated within the cable from the $I^2R$ losses of the conductor, dielectric losses in the insulation and losses in the metallic component of the cable. The ampacity is dependent on how this heat is transmitted to the cable surface and ultimately transmitted to the environment, whether that environment is air or ground. If the cable is able to dissipate more heat it can carry more current. All of these factors are taken into account by use of the IEC 287 guidelines and recommended equations. In addition, as mentioned before, the real time values of temperature are being fed into this algorithm via a DTS system and fiber optic lines in proximity to the power cable that are able to monitor the temperature conditions to improve the accuracy and predictive ability. The fiber optic lines may, as mentioned before, be integrated into the power cable but can also be in proximity to the power cable, such as those in a nearby OPGW cable. The fibers in a deployed OPGW will experience the same wind, sun, and temperature exposure as that of the power cable.

Cable design varies with application and different equations are needed for each. As an example of some of the defining equations for static condition modeling a cross section of a single core metal sheathed wire armored power cable in shown in FIG. 6. In this cable design a central cable is surrounded by an insulation layer, then a sheath/screen system, a layer of bedding, then a steel wire armored layer and an outer serving. For this design the equations define an overall temperature difference AΘ calculated by $$\Delta\theta = (I^2R + 0.5W_d)T_1 + (I^2R[1+\lambda_1] + W_d)nT_2 + (I^2R[1+\lambda_1+\lambda_2] + W_d)n(T_3+T_4) \quad (1)$$

Figure 6:
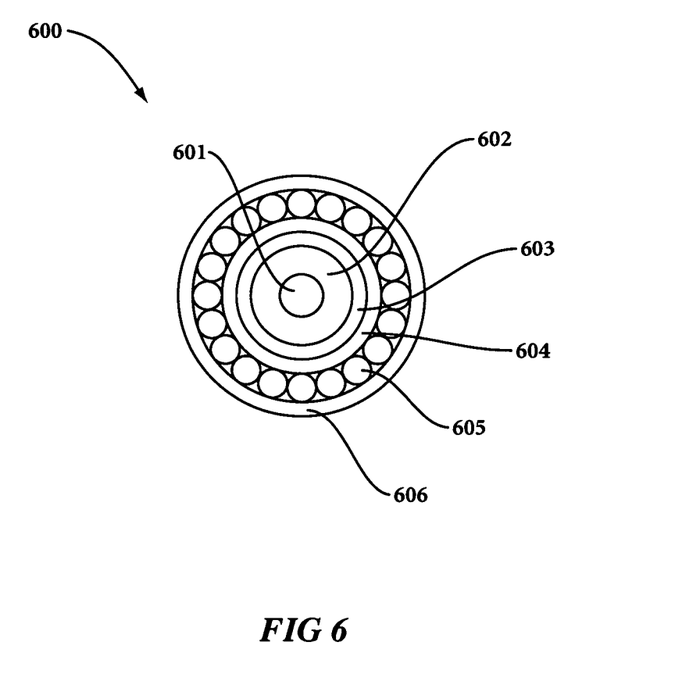
FIG. 6 illustrates another power cable design with a series of alternate layers.

From this equation a formula can then be obtained for the permissible current as follows:

$$I = \left[ \frac{\Delta\theta - W_d(0.5T_1 + n[T_2 + T_3 + T_4])}{RT_1 + nR(1+\lambda_1)T_2 + nR(1+\lambda_1+\lambda_2)(T_3+T_4)} \right]^{0.5} \quad (2)$$

Where:
I=Permissible continuous constant current (100% load factor) in one conductor of the cable. (A)
R=a.c. resistance of conductor at maximum operating temperature (O/m)
T1=Thermal resistance between the conductor and sheath (K·m/W)
T2=Thermal resistance between sheath and the armor (K·m/W)
T3=Thermal resistance of the outer serving. (K·m/W)
T4=Thermal resistance of the surrounding medium. (K·m/w)
Wd=Dielectric Loss per unit length per phase (W 1 m)
n=Number of current carrying conductors in the cable.
ΔΘ=Temperature difference (K)
$\lambda_1$=Sheath loss factor $\lambda_2$=Armor loss factor FIG. 6 represents one type of cable construction. In this design an insulating layer 602 and then a sheath/screen system 603 surrounds a central conductor 601. A bedding layer 604 and then armor layer 605 surrounds the sheath/screen. An outer serving 606 then covers the cable. Many other combinations are possible. The systems can be one core, or multiple cores. They can include various sheathed cables, concentric neutrals, armored cables, various screens, shields, beddings, servings and jackets. Any of these can be modeled using heat transfer principles. Other designs and therefore other modeling equations are anticipated in this inventive concept.

In real life situations the loads are transient rather than static. Many cables will take a significant time for the temperature to build up to the steady state value after a change. Transient operation can thus carry a significantly higher load for a given maximum conductor temperature during a constant load because the cable (and its environment) is capable of storing heat during peak loads and dissipating the stored heat under lower loads. Many transient factors are taken into account in the transient equations. Transient calculations are based on methods described in IEC Standards 853-1 and 853-2. These can be used with either step functions supplied by the user or the actual load factors collected and stored over recent time periods can be scaled and applied. As the system runs it becomes more predictive as details of the daily, weekly and seasonal load cycles are accumulated. The system described here makes use of an artificial intelligence (AI) algorithm to learn and fine-tune the predictive ability over time.

With the collection of each temperature trace, the prediction system's internal database containing the temperature information on the cable along with the load that the cable is carrying at that particular time is updated. This time-stamped data for the distributed cable temperature along with the load carrying information can then be arranged to display important output on display 108 of FIG. 1. An illustration of such capability is illustrated in FIGS. 4(a) and 4(b). With the fast and almost real time collection of the distributed temperature information the distributed ampacity model can estimate the recent heat transfer scenarios and then forecast an estimate of the increased cable temperature with additional load that can be carried out over time. As seen particularly in FIG. 4(b) an estimate of the dynamic ampacity of the power cable rather than using a previously calculated load limit based on very conservative assumed cable conditions (which limited the cable's usable capacity). With such a distributed ampacity estimate the user will be able to manage the load carrying capability of the power cable hence increasing circuit capacity and operating flexibility. After increasing or decreasing the load carried by the power cable, the system continues monitoring the distributed temperature of the cable as a function of new loads, thus updating the database.

Figure 3:
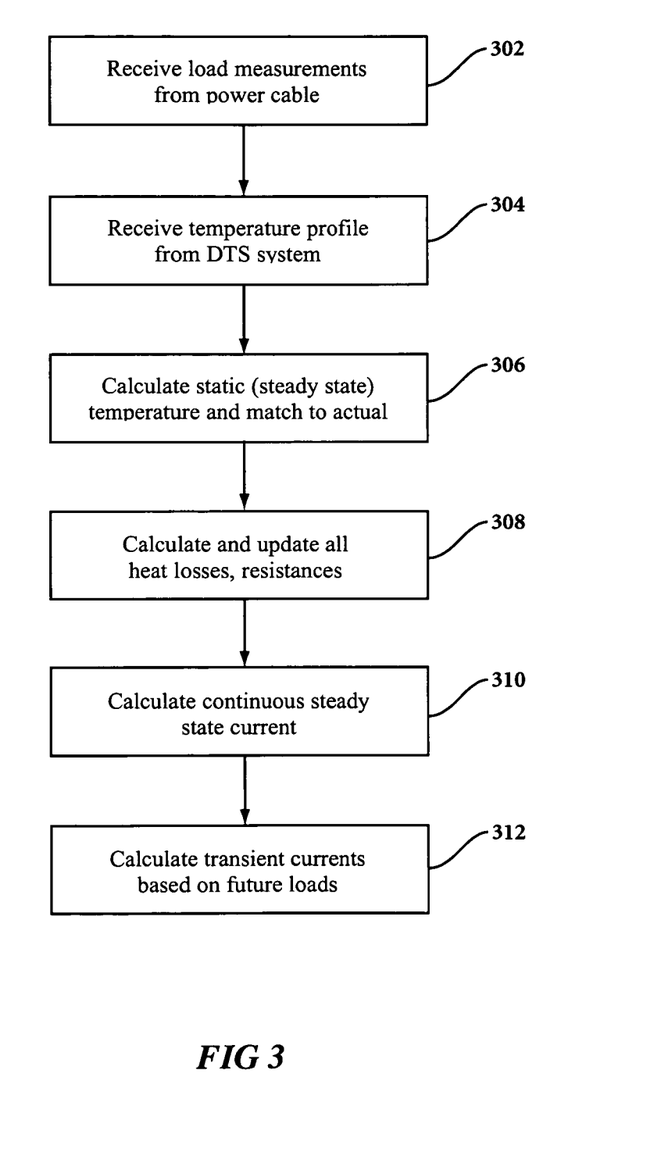
FIG. 3 illustrates a flowchart for determining ampacity, in accordance with embodiments of the present disclosure.

Referring to FIG. 3, a flowchart illustrating a method of determining ampacity on power cable 200 is shown, in accordance with embodiments of the present disclosure. In operation, at step 302 power cable load measurements are received from a load-measuring device. The system also receives 304 the power cable temperature profile from the DTS unit. In step 306 the static heat transfer equations are solved and matched to the measured temperatures from the DTS system to calculate a static temperature of the conductor. From this information updated calculations can be done 308 on all heat loses and thermal resistances and capacitances for the various layers (insulation, sheath, etc.) of the power cable system. This then allows a new calculation 310 of the continuous steady state current and thus the ampacity. Finally, based on inquiries from the user the transient equations can be solved 312 to calculate transient current through time for any requested load condition.

Figure 5:
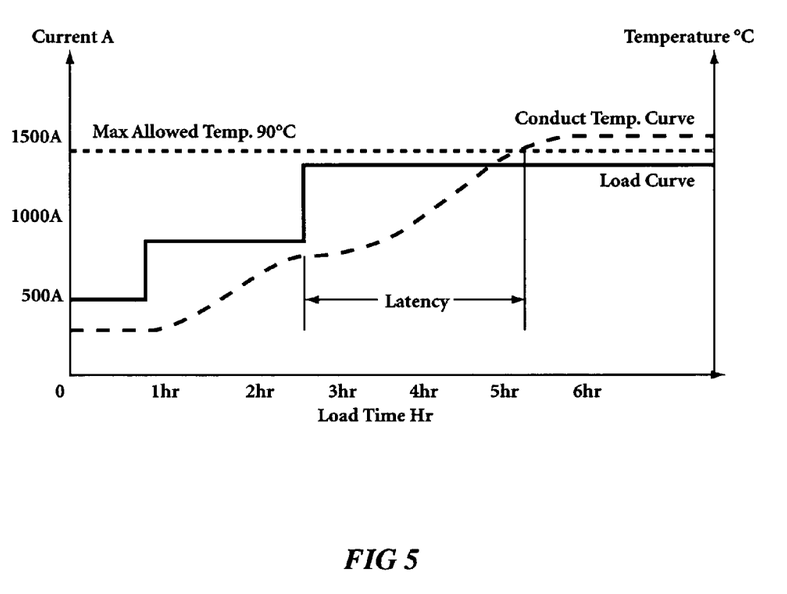
FIG. 5 illustrates a prediction capability of the inventive concept.

FIG. 5 exhibits a sample calculation and display for the user. The black staircase line represents a load curve request from the user over time. The maximum allowed temperature for static load is shown as the straight dashed line and the curved dashed line labeled as "conductor temperature curve" line is the model calculated transient conductor temperature calculated from step 312. Under the protocols available the user could make other inquires, for example could input a future load and request an analysis of load time to reach a maximum allowed temperature or could input a load time and request a maximum load allowed.

In some embodiments, the load measurements can be received at a predetermined fixed interval. The predetermined interval can be set manually by a user or be set by DTS system 110 and/or processor 102. The ability to record load measurements is used to build historical data that can provide insights to the current use of power cable 200 and to manage future load determination for power cable 200.

In the same or alternative embodiments, a user can request real-time information from the power cable and can enable DTS system 110 and/or processor 102 to request the load information. By allowing for real-time information, a user (e.g., power company) can prepare for upcoming load demands due to weather, imminent rolling black outs, mandatory grid lockdown, down power cables, and other scenarios.

At step 304 (FIG. 3), DTS system 110 and/or processor 102 can determine the temperature profile of power cable 200. The temperature profile determination can be done at substantially the same time as step 302 or alternatively, can be done at a separate and distinct time from step 302.

In one embodiment, DTS 110 can be configured to enable a light source to emit one or several wavelengths through sensing fiber(s) 204. Reflected light signals, including spontaneous and stimulated Raman signals can be collected by DTS system 110 and can be used to determine the temperature profile, including any hot spots, of power cable 200 based for example on the ratio between the Stokes and anti-Stokes signal. In one embodiment, DTS system 110 can receive signals relating to the temperature profile of conductors 202 of power cable 200. In the same or alternative embodiments, DTS system 110 can receive signals from sensing fiber(s) 204 relating to the temperature profile of the environment surrounding power cable 200 (e.g., ambient air, underground temperature, etc.).

As the load on power cable 200 increases or decreases, system 100 of FIG. 1 can monitor the distributed temperature (step 304 of method 300 of FIG. 3) of power cable 200 as a function of new load and can be configured to store the information in memory 104 for future analysis. With such a system, the power cable industry can better manage demands on the grid that exist for a short interval without causing black-outs or power outage, at the same time, safely operating within the parameters of power cable 200.

As an example of an important issue that cannot be handled in current approaches DTS system 110 can monitor hot spots along the power cable. These hot spots can be caused by other power cables crossing the path and generating heat, steam pipes that cross near the cable or in a worst case may even run next to the power cable for some distance, localized manufacturing defects in the power cable (high localized resistance R). Other issues could be varying thermal resistivity in the ground along the length of the power cable or cable duct. Other hot spots could be cable splices where you need to connect two lengths of cable, and these joints are often a concern. Because these hot spots are often suspected for example when a power cable runs near a steam line, the cable may arbitrarily be limited to 70% of its capability simply because the actual hot spot location and magnitude is not known precisely. With real time knowledge of actual temperatures being supplied by DTS unit 110 the system can accurately model the actual load shape and allow the cable to be operated up to the design rating at all times.

In one embodiment, processor 102 and/or system 110 can provide the processed information to a user (e.g., power company) various statistics corresponding to the data collected in steps 302 through 312. Referring to FIG. 4A, processor 102 may provide graphical data to the user on, for example, display 108 actual data and extrapolated estimation data of the temperature of power cable 200 as a function of load.

Similarly, as shown in FIG. 4B, processor 102 may provide a graphical representation of the maximum load on power cable 200 as a function of time.

Finally the database of both static and transient data accumulated by the models and the DTS monitoring are used to predict reliable lifetime of the cable based on cumulative time at various load conditions as well as to predict the aging of insulation material in the cable based on known aging data. This data can be used to predict maintenance and identify hot spot locations to allow remedial actions before significant cable degradation occurs.

All of the methods disclosed and claimed herein can be executed without undue experimentation in light of the present disclosure. While the methods of this disclosure may have been described in terms of preferred embodiments, it will be apparent to those of ordinary skill in the art that variations may be applied to the methods and in the steps or in the sequence of steps of the method described herein without departing from the concept, spirit and scope of the disclosure. All such similar substitutes and modifications apparent to those skilled in the art are deemed to be within the spirit, scope, and concept of the disclosure as defined by the appended claims.

The invention claimed is:

1. A method for determining and displaying future current power load characteristics of power cables comprising the components of conductor metals, insulators, sheathings, bedding, and armors using distributed temperature sensing (DTS) systems comprising the steps of:
   receiving current load measurements from the power cables;
   receiving current temperature profiles of the power cable from the DTS system;
   calculating, from static thermal models of the particular power cable, the static temperatures of the various components of conductor metals, insulators, sheathings, bedding, and armors consistent with the current temperature profiles from the DTS measurements;
   calculating and updating all of the static heat losses and resistances of the components;
   calculating the static power load of the power cable;
   calculating, from transient thermal models, future power loads and temperatures reached for different future load scenarios;
   displaying these future temperatures and power loads on a display device suitable for creating graphic images and/or alphanumeric characters recognizable to a user;
   storing the static and transient data accumulated from the models and the DTS monitoring into a database for future display; and
   using the stored data to predict reliable lifetime of the power cable based on cumulative time at various load conditions.

2. The method of claim 1 further comprising the step of using the stored static and transient data to predict the aging of insulation material in the power cables based on known aging data.

3. The method of claim 1 wherein said DTS system comprises one or more light sources and the method further comprises the steps of:
   emitting one or several wavelengths through an optical fiber deployed along the power cable;
   collecting backscattered Rayleigh and/or spontaneous and/or stimulated Raman wavelengths; and
   using said backscattered wavelengths to determine a distributed temperature profile of the power cable.

4. A system for determining power load characteristics of a power cable system comprising;
   a processor;
   a distributed temperature sensing (DTS) system coupled to a processor, the DTS system configured to:
   receive as input a load measurement of a power cable;
   receive signals relating to the distributed temperature profile of the power cable, including hot spots;
   forward the received load measurement and signals relating to the temperature to the processor;
   a fiber optic sensor connected to said DTS system and deployed next to, in proximity of, in direct contact an exterior wall, or within said power cable;
   a memory device coupled to said processor operable to retain program instructions and store data from said processor and said DTS system;
   a network port operable to transmit information from said system for determining characteristics of power cables to an exterior network; and
   a display device operable for creating graphic images and/or alphanumeric characters recognizable to a user;
   a database that stores the load measurement data as well as static and transient data accumulated from the fiber optic sensor;

wherein the processor is programmed to use the static and transient data from the database to predict a reliable lifetime of the power cable based on cumulative data at various load conditions and to determine the characteristics of the power cable based at least on the received load measurement and signals relating to the temperature of the power cable system.

5. The system of claim 4 further wherein said fiber optic sensor is a spare fiber in an optical fiber composite overhead ground wire (OPGW) in the power cable system.

* * * * *

UNITED STATES PATENT AND TRADEMARK OFFICE
CERTIFICATE OF CORRECTION

PATENT NO. : 8,775,151 B2  
APPLICATION NO. : 12/998531  
DATED : July 8, 2014  
INVENTOR(S) : Mahesh U. Ajgaonkar, Kent Kalar and Kari-Mikko Jaaskelainen Page 1 of 1

It is certified that error appears in the above-identified patent and that said Letters Patent is hereby corrected as shown below:

Title page, item [76] inventor: Mahesh U. Algaonkar
should read as follows: --Mahesh U. Ajgaonkar--

Signed and Sealed this
Fourth Day of November, 2014

Michelle K. Lee
*Deputy Director of the United States Patent and Trademark Office*